Jan. 29, 1935.  A. J. HOLMAN  1,989,094
OPTICAL ECONOMIZER
Filed Dec. 14, 1929  3 Sheets-Sheet 1
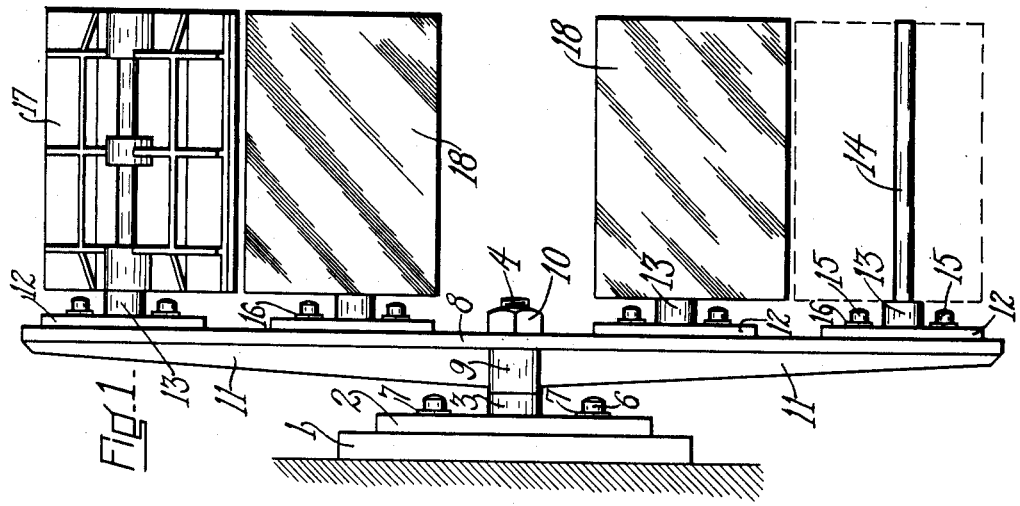
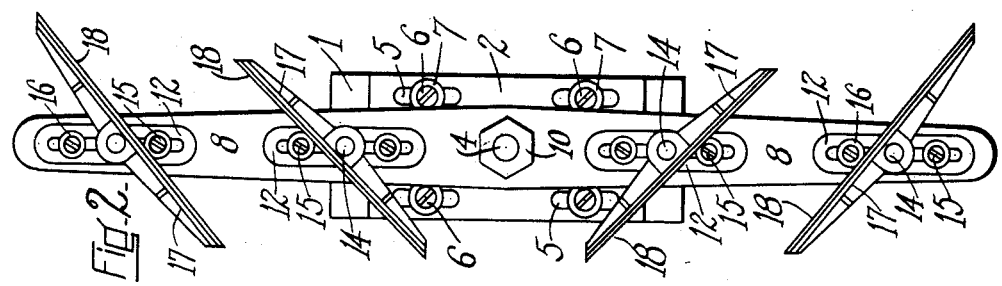
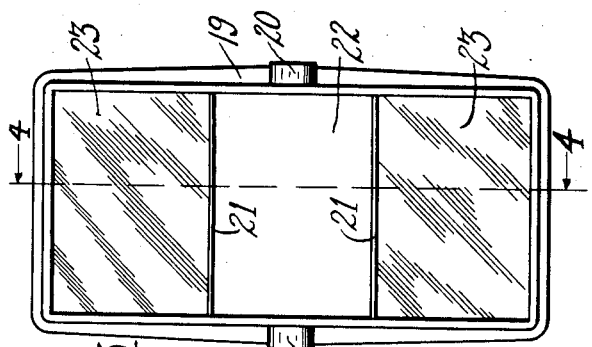
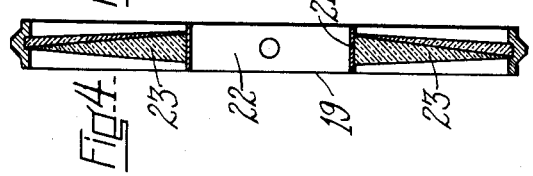
INVENTOR=
Arthur J. Holman.

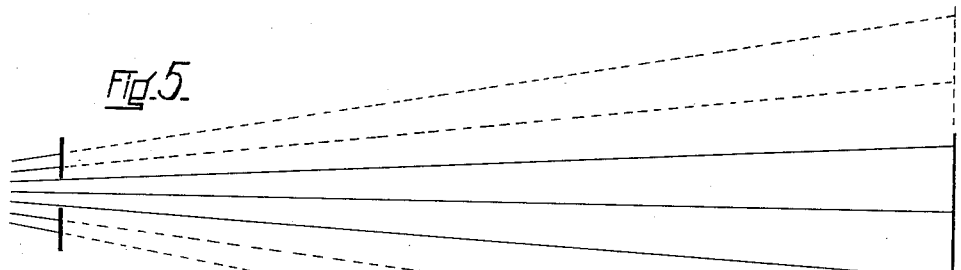
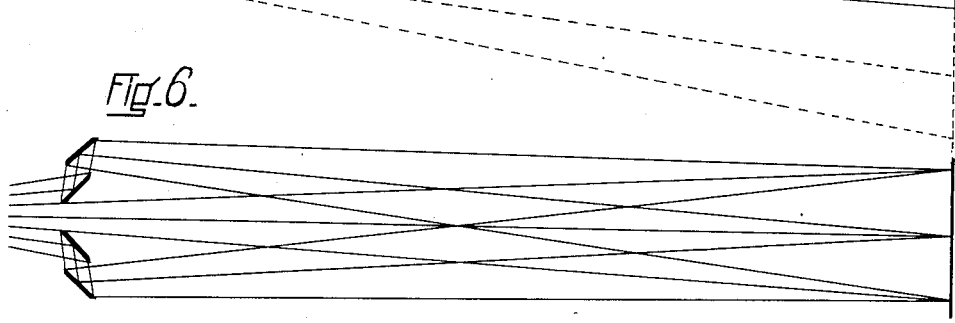
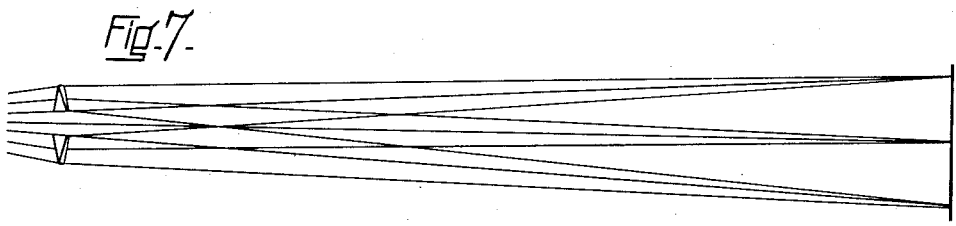
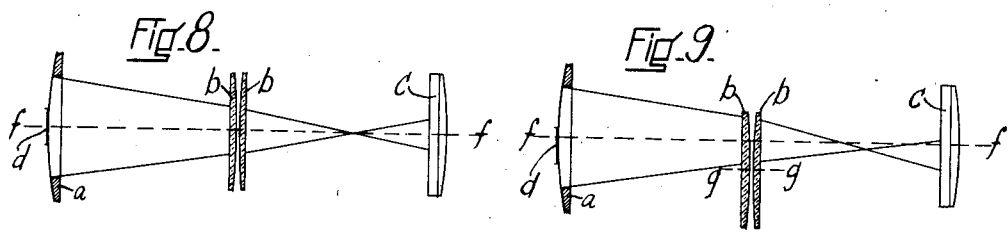
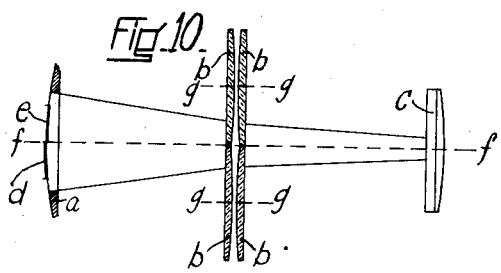

Jan. 29, 1935.  A. J. HOLMAN  1,989,094
OPTICAL ECONOMIZER
Filed Dec. 14, 1929  3 Sheets-Sheet 3
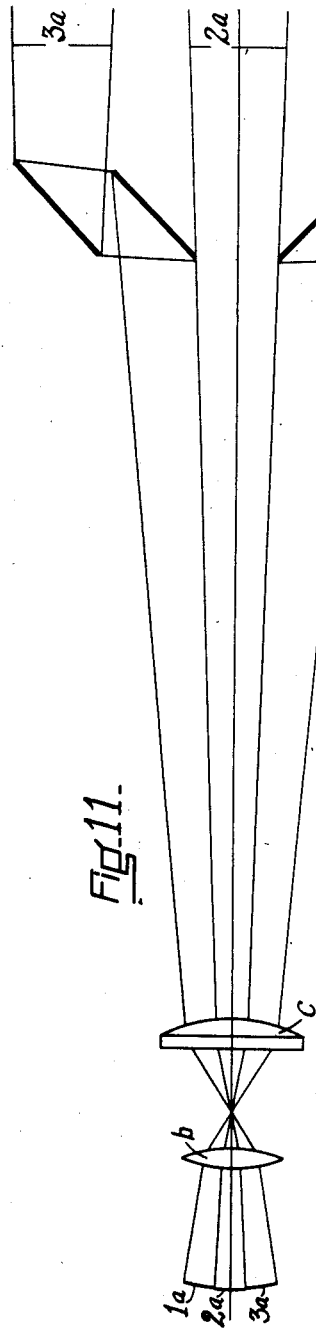
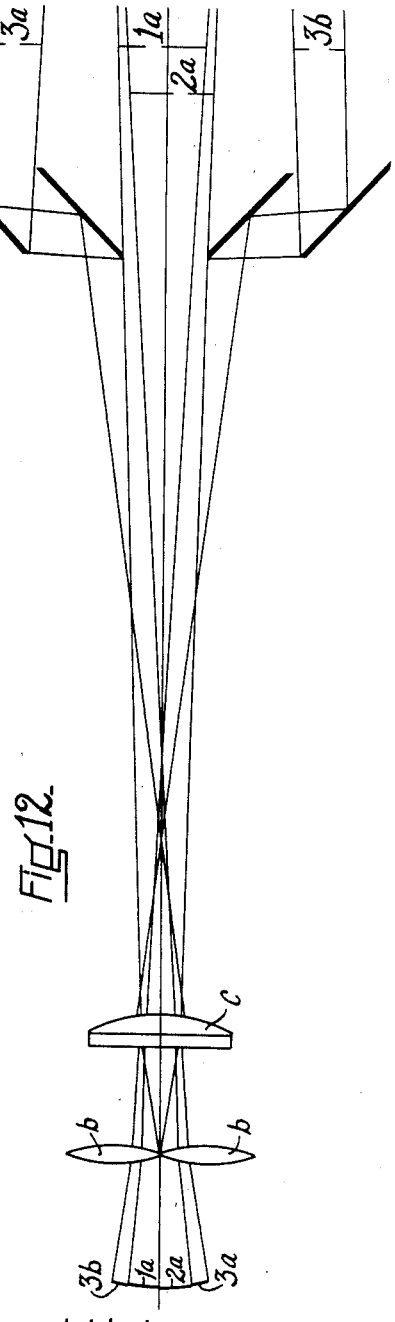
INVENTOR =
Arthur J. Holman.

Patented Jan. 29, 1935

1,989,094

UNITED STATES PATENT OFFICE 1,989,094

OPTICAL ECONOMIZER

Arthur J. Holman, Brookline, Mass.

Application December 14, 1929, Serial No. 414,094

5 Claims. (Cl. 88—16.8)

My invention relates to a device for use in combination with projecting apparatus wherein the film strip is kept continuously in motion and the effect of said motion is so compensated by means of moving optical rectifying elements as to produce a steady well defined image. It is well known to those familiar with optical rectifying systems, that a large portion of the light emanating from the objective of projectors embodying such systems, is so directed by the optical rectifiers that it is not usuable on the screen; i. e., it will produce objectionable flickering images, one above and one below the screen, unless it is masked off, or redirected, forward of the objective. It has been the special object of my invention to provide means whereby this heretofore wasted light will be so redirected as to fall upon the screen in exact registration with the images produced by the rest of the light emanating from the objective, thereby greatly increasing screen illumination and also effectively eliminating intensity flicker. My device is especially applicable to projecting apparatus described in my U. S. Patent No. 1,584,098 of May 11, 1926, also in my co-pending patent application Serial No. 441,657, filed April 4, 1930, and in connection therewith will double screen illumination and will provide a dissolving action over the entire picture cycle thereby increasing the already marked appearance of depth in the screen presentation and making the system particularly well adapted for use in showing pictures in natural colors by the relatively inexpensive additive process. I have sought to accomplish these results by a simple device, having no moving parts, which is easy to install and which takes the place of the mask heretofore required to block off the flicker images that would otherwise appear above and below the screen.

My device and its application and uses may be best understood by reference to the drawings in which—

Fig. 1 is a rear view of the reflector form of my device.

Fig. 2 is a side view of the device shown in Fig. 1.

Fig. 3 is a rear view of the prism form of my device.

Fig. 4 is a cross-section on line 4—4 of Fig. 3.

Fig. 5 is a diagram illustrating the use of a mask for eliminating the flicker images above and below the screen.

Fig. 6 is a diagram illustrating the use of the reflector form of my device for redirecting light emanating from the objective to the screen.

Fig. 7 is a diagram illustrating the use of the prism form of my device for redirecting light emanating from the objective to the screen.

Fig. 8 illustrates diagrammatically the optical parts of one form of continuous projector, showing a single film frame centered on the aperture.

Fig. 9 is like Fig. 8 except that film and optical rectifying means have advanced slightly Fig. 10 is like Fig. 9 except that film and optical rectifying means have further advanced to the position in which a pair of adjacent film frames are centered on the aperture.

Fig. 11 illustrates, diagrammatically, an optical rectifying system of the multiple lens type in combination with the reflector form of my device, showing conditions at the instant when a rectifying element is centered on the axis of the system.

Fig 12 illustrates the same apparatus as Fig. 11, showing conditions at the instant when a pair of rectifying elements are centered on the axis.

Referring now more specifically to the drawings, in which like numerals indicate like parts, 1 is a metallic plate which is suitably attached to a vertical support forward of the projector position. An adjustable plate 2, having integral boss 3 into which is fixed the stud 4, is provided with slots 5 through which pass the screws 6 which enter the plate 1 thereby holding adjustable plate 2 in position. Suitable washers 7 are provided under heads of screws 6. A bracket 8, having integral boss 9 bored to fit on stud 4, is pivoted on stud 4 and is locked in any desired position by nut 10. The bracket 8 is provided with stiffening web 11 and is faced on one surface to seat four adjustable plates 12 each of which is provided with an integral boss 13 into which is fixed a stud 14. The adjustable plates 12 are slotted to receive screws 15 which are provided with washers 16 and enter the bracket 8 thus securing the adjustable plates to the bracket. Pivoted on each stud 14 is a webbed plate 17 to which is cemented or otherwise suitably attached a reflector 18. The webbed plates 17 may be fixed in any angular position on the studs 14 by suitable set screws in one or more of the bosses surrounding each of the studs 14. The reflectors 18 must have good optical surfaces and if they are made of glass the surfaces of each reflector should be substantially parallel and the second surface should be silvered.

The other form of my device, Figs. 3 and 4, consists of a frame 19 provided with symmetrically placed bosses 20 which are bored to fit over suitable pivot pins. The frame 19 is provided with cross members 21 which divide the space within the frame into three equal parts. The central portion 22 is left open but the other spaces are each filled with an achromatic prism 23 having its base adjacent a cross member 21.

As I have already stated, my device takes the place of the mask heretofore used to block off the flicker images which would otherwise appear above and below the screen. Fig. 5 shows diagrammatically how the mask is placed to intercept the undesirable light rays that emanate from the objective of all continuous projectors having a multiplicity of optical rectifying elements. It will be apparent that much of the light transmitted by the projector optical system will be absorbed by the mask and thus wasted. In fact the mask will cut off about the same amount of light as the shutter does in the usual intermittent projector system. I have called my device an optical economizer because it utilizes this heretofore wasted illumination by redirecting it to the screen.

In the past, inventors of continuous projectors embodying a plurality of rectifying elements and an elongated aperture, have failed generally to appreciate the fact that such devices project objectionable flickering images immediately above and below the area of the screen proper, and the few who have learned of these superfluous images by experience, have usually avoided mention thereof in patent specifications because such images have been considered decidedly detrimental to continuous projection and actually are so unless they are masked off entirely. In Letters Patent of the United States No. 1,356,787, dated October 26, 1920, and issued to Edwin F. Porter of Boston, Mass., there is illustrated a "framing screen O", which performs the function of masking out the superfluous images. On page 2, lines 24–32 of this patent appears the following significant statement:—"The pictures above and below it" (referring to the central image of the three projected images) "may be obscured by the framing screen O indicated in Fig. 3 which may be adjustably connected with the frame A or otherwise independently supported and which has an aperture sufficient to permit the display of the picture intended to be represented on the screen while obscuring the images of the pictures above and below." Although this statement appears merely to specify the size of aperture in "framing screen O", it actually defines its position as well because screen O cannot perform the function specified unless it is properly positioned with respect to the projector.

There has been considerable misunderstanding among laymen as to just where the mask should be positioned, with respect to the projector and the screen, to secure the desired results; i. e., the elimination of undesirable flickering images above and below the screen without, at the same time, creating a flicker within the area of the screen and more particularly adjacent the upper and lower margins. The first requirement in positioning the mask is that the mask shall not be conspicuous to the audience in the theatre, and the second requirement is that the mask must be a sufficient distance forward of the projector to permit the use of reasonably narrow strips of light absorbing material as a border around the screen. The opening in the mask must, of course, have a vertical dimension sufficiently large to pass light to all parts of the screen from all areas of the objective lens; i. e., the edges of the mask must not cause a flicker within the screen area. Experience has taught those skilled in the art of continuous projection that the opening in the mask must be large with respect to the diameter of the objective lens and furthermore, that the mask must be placed several feet forward of the objective lens. This is true because the objective lens does not behave like a point source of light located at the equivalent center of the lens (as shown in the usual diagram) but actually passes a light beam having a cross-section approximating in area the free opening of the lens.

In determining the best position, with respect to the projector and the screen, for an optical economizer, it is necessary to consider some additional factors: the mirrors or prisms must not be too large, and the magnification from economizer to screen must not be too great. On the other hand, the economizer must be positioned far enough along the projected light beam to allow the ray-bundles carrying the separate film frame images to become segregated one from the other. In modern theatre practice, the magnification from film frame to screen is seldom greater than 400 diameters, and averages around 300 diameters. If the magnification from economizer mirrors to screen is kept between 15 and 25 diameters, the mirrors will not be excessively large and, moreover, they will be relatively inexpensive since a low magnification does not require extreme accuracy in the reflecting surfaces. Furthermore, the light intensity and hence the heat on the economizer mirrors, will be relatively low, therefore the mirrors will not be subject to rapid deterioration. A consideration of all factors leads to the conclusion that the optical economizer will function best when positioned forward of the projector in the place formerly occupied by the mask.

*Method of installing and adjusting my device*

The reflector form of my device is installed in connection with a continuous projector of the type described in my said patent in the following manner:—Assuming that the projector has been set up in the booth and so alinged that its optical axis, if extended, will pierce the center of the screen, and a suitable vertical support has been provided at the position forward of the projector where the mask would usually be and slightly to one side of the extended optical axis, the plate 1 is secured to the vertical support in such a position that the stud 4 may be shifted sufficiently to make its axis, if extended, intersect the extended optical axis. With the stud 4 in this position the screws 6 are tightened. The bracket 8 is then mounted on the stud 4, turned to the position where it stands normal to the extended optical axis and locked by tightening the nut 10. The adjustable plates 12 carrying studs 14 and reflectors 18, are then mounted on the bracket 8 as shown in the drawings, the central reflectors being turned partially toward the projector and the top and bottom reflectors being turned partially toward the screen. The central reflectors are set at an angle of 45 degrees to the extended optical axis and adjusted till their edges adjacent the axis are in the positions occupied by the edges of the mask heretofore used in connection with continuous projectors. The upper and lower reflectors are adjusted, preferably one at a time, while the projector is in operation by varying the angle till the images register on the screen. The upper and lower reflectors are adjustable along the bracket 8 for the purpose of securing such spacing from their respective central reflectors as will assure free passage of light to the screen. When the above adjustments have been made, all light emanating from the projector objective will pass to the screen as shown diagrammatically in Fig. 6.

The prism form of my device as shown in Fig. 3 and Fig. 4 must be designed and constructed for the special conditions of the theater in which it is to be used and is not adjustable to other conditions except as it is fitted with other prisms. The only requirements for mounting this form of my device are a pair of suitably supported pivot pins to enter the bores in the bosses 20 and a suitable means for locking the frame 19 in a position normal to the extended optical axis. This device is mounted at the position forward of the projector usually occupied by the mask, the cross members 21 of the frame 19 being positioned where the edges of the mask would be. With this form of my device, when properly adjusted, the path of the light from the projector to the screen is illustrated diagrammatically in Fig. 7.

*Characteristics of optical system*

In my Patent No. 1,584,098 I describe a means for eliminating the intensity flicker on the screen and also a means for improving screen definition by reducing the amplitude of the inherent periodic variation. Both of these devices function as diaphragms or stops and are therefore undesirable if other means can be found to produce superior screen illumination with equal or better definition. I have submitted Figs. 8, 9 and 10 to illustrate the nature of the problem involved in providing flickerless screen illumination. In these figures, *a* represents an aperture plate in vertical cross-section, *b b* are lens elements on the overlapping rotatable discs, *c* is the front component of the objective system, and *d* represents an individual picture frame on the film strip. The optical axis of the projector is indicated by the broken line *f—f*. In Figs. 9 and 10, the broken lines *g—g* represent horizontal planes through the optical centers of overlapping lens elements. In Fig. 10, *e* is the picture frame adjacent to the picture frame *d*.

When a mask, as illustrated in Fig. 5, is being used with the projector, the only light reaching the screen, under the conditions shown in Figs. 8 and 9, is that transmitted through the single picture frame *d*. As the frame *d* advances downward from the position shown in Fig. 9 toward that shown in Fig. 10, the second pair of overlapping lens elements enters the converging cone of light that has passed through the aperture plate and begins to transmit some light from the picture frame *e* to the screen as described and illustrated in my said patent. In the position illustrated in Fig. 10, each of the frames *d* and *e* is supplying equal illumination to the screen. When a mask is employed it is to be noted that screen illumination comes, for the greater part of the picture cycle, from a single picture frame, and for the remainder of the cycle from two adjacent picture frames, therefore some diaphraming effect must be resorted to to prevent excessive intensity flicker.

Since the entire aperture of a continuous projector must be uniformly illuminated, an examination of Figs. 5, 8 and 9 shows that if the screen were three times the normal height and no mask were used, there would appear upon the screen, one above the other, an image of each of the three film frames overlying the aperture. It is the function of my device to superimpose these multiple images in exact registration on a single-image screen, thereby creating a single composite image possessing all the picture and color values of each of the three components. With my optical economizer in position, the film frames adjacent the frame *d* will pass light through the objective system which will be redirected so as to reach the screen, and the images carried thereby will register with the image of the film frame *d*. For the condition illustrated in Fig. 10, the optical rectifying system automatically takes care of registering the images of the frames *d* and *e* on the screen but my optical economizer will redirect the light which has passed through the aperture above and below these two frames so as to make it add to the screen brilliancy. It is apparent, therefore, that such an optical rectifying system, when used in conjunction with my optical economizer, will produce constant and uniform screen illumination without the use of diaphragms, thus permitting an exceptionally high light transmission efficiency for the rectifying system. From this analysis the conclusion follows naturally that, as soon as a film frame appears over the aperture, that frame begins to add useful image forming light to the screen and continues to do so till it has passed below the aperture, therefore I have secured on the screen an overlapping dissolving action covering the entire picture cycle, a condition which adds materially to the already marked appearance of depth in the screen image.

This continuous overlapping dissolving action, involving at least three separate film frames at all times, makes the system ideal for color projections employing the so-called "additive" process, and especially suited to the production of more nearly natural color from a three color positive print of the Kinemacolor type. The Kinemacolor system, as applied to intermittent projectors, had many serious drawbacks among which were, the requirement of twice normal projection speed for a two color process, the physical impossibility of a three color process because of the excessive projection speed involved, and the inherent inability to produce on the screen itself the actual colors. In commercial Kinemacolor projection, the screen images were intermittently and alternately tinted orange-red and blue-green by means of suitable filters, and the observer's eyes received these separate tinted impressions, but, due to double speed projection and certain physiological phenomena, the observer's brain conceived the impression of the average color values, the process, however, involving increased eye strain and mental fatigue. At first the filters were used in the form of sectors on a rotating disc operating in connection with the projector shutter and arranged to color the rays emanating from the objective alternately orange-red and blue-green. A later development applied the filters direct to the film by tinting alternate frames orange-red and the remaining frames blue-green, the orange-red tint being applied to those frames printed from a negative photographed through an orange-red filter, and vice versa. A continuous projector of the type described, when equipped with my optical economizer and a suitable ring color filter, will actually reproduce from a Kinemacolor print, the natural colors upon the screen, due to the physical mixing of the tinted images through the medium of the overlapping dissolving action. A three color positive print of the Kinemacolor type, having three distinct color values periodically appearing successively along the film, is very economical to produce as no colors are required on the print itself, the print being black and white. Moreover, natural colors are obtained at a projection rate of 24 frames per second which is the standardized rate of projection for sound pictures.

The manufacture of prints in natural color, having the sound track on the film, is rather difficult as it involves several additional operations on the blank. It is therefore more expensive and, on the whole, less satisfactory as regards definition and registration of primary colors, than the straight color print having no associated sound track. Since Kinemacolor positive prints can be made with an associated sound track by a single direct printing operation, it is evident that the addition of sound does not complicate the manufacture of such prints any more than it does the manufacture of ordinary black and white sound prints. The operation of applying the color filters direct to such an additive color sound film is not complicated or expensive, due to the fact that the respective filters are each applied over the entire area of a film frame, and, therefore, there is no problem of exact registration in the application of the colors. It is to be noted also that the addition of the colors, in the form of filters, in no way affects the definition of the image, because definition in the film pictures is determined solely, as in ordinary black and white prints, by the quality of the silver image in the gelatine coating. Thus my optical economizer, in combination with an optical rectifying system of the multiple lens type, provides economical and accurate means for exhibiting natural color motion pictures, using a three-color additive process.

While it is true that objectionable color fringe appeared on rapidly moving objects with the Kinemacolor system, especially when the movement took place across the field of view in the foreground of the picture, nevertheless the system has great possibilities when the film is exhibited in a continuous projector in which the dissolving action includes several film frames simultaneously. When the screen illumination is coming through three separate film frames it is apparent that each frame is supplying approximately one third of the total screen brilliancy and therefore it is evident that the color fringe will be only one third as brilliant as the object on which the fringe appears. Moreover, due to the relatively slow dissolving in and dissolving out of the individual colors, the detrimental effect of even this one third intensity fringe is greatly diminished.

To further illustrate the operation of my economizer in combination with an optical rectifying system, I have submitted Figs. 11 and 12, in which is illustrated diagrammatically, an optical rectifying system of the multiple lens type in combinaiton with the reflector form of my optical economizer. The stationary component of the objective system is shown at c, the movable rectifying elements at b, and the film frames overlying the aperture in the aperture plate are indicated as 1a, 2a, 3a and 3b. In order to illustrate the principle involved in producing natural colors on the screen from a Kinemacolor type of print carrying three primary color values, each in separate suitably tinted film frames arranged on the film in regular sequence, let us say that 1a carries the blue values and is tinted blue, 2a carries the yellow values and is tinted yellow, 3a carries the red values and is tinted red, and 3b, representing the film frame following after 1a across the aperture, also carries the red values and is tinted red. It will be observed from Fig. 11, that each rectifying element, when centered on the optical axis, transmits all three primary color values at one time, but the image-bearing rays from each of the three film frames 1a, 2a and 3a, pass through the objective system and the coacting economizer in separate bundles, which are not mixed to form the true colors of objects in the scene till they strike the surface of the screen, (Figs. 6 and 7). In the economizer, at the instant illustrated in Fig. 11, the 3a image rays are redirected to the screen by the upper pair of mirrors, the 2a image rays go directly to the screen without reflection, and the 1a image rays are redirected to the screen by the lower pair of mirrors. Inasmuch as one rectifying element b, passes the axis with each film frame, it will be evident that the image of each film frame, as the film frame crosses the aperture, will be transmitted to the screen, first, by the lower pair of economizer mirrors, then, directly through the economizer between the pairs of mirrors without reflection, and finally, by the upper pair of economizer mirrors, hence each section of the economizer handles successively each film frame image and, therefore, each primary color value. It is for this reason that the filters are placed, preferably, directly on the film frames, this system of correctly coloring the image rays being the most convenient from the projection standpoint.

In Fig. 12, the conditions are somewhat different from those shown in Fig. 11, because the rectifying system is itself capable of producing a smooth, even dissolving action between any two adjacent film frames. At the instant illustrated in Fig. 12, the image rays from the frames 2a and 1a, are transmitted by the rectifying system through the central portion of the economizer and reach the screen without reflection. The upper half of the frame 3a, which still overlies the aperture, is imaged on the screen by means of the upper pair of economizer mirrors coacting with the rectifying system, and the lower half of the frame 3b, which is complementary to the half of the frame 3a overlying the aperture, is imaged on the screen through the agency of the lower pair of economizer mirrors coacting with the rectifying system.

Figs. 11 and 12 illustrate the two cardinal positions of the optical rectifying elements, and are sufficient to impart a complete understanding of the co-operation of my optical economizer in combination with a projector of the optical rectifying type. Other diagrams, illustrating different positions of the optical rectifying elements, may be drawn by anyone understanding the principles of optical rectifying systems. It is sufficient to state that the economizer, in co-operation with the rectifying system, transmits to the screen an image of all film frames overlying the aperture of the projector for all positions of the rectifying elements, i. e., there is a continuous, uniform dissolving action in the screen image, which involves all the film frames overlying the aperture of the projector. This condition, while offering the ideal arrangement for the showing of natural color motion pictures by the additive process, is also of prime importance in connection with the exhibition of black and white prints, because it provides a smoothness of action and a quality of screen image, which is but partially realized in continuous projection without an economizer, and which is entirely unknown in intermittent projection with its inherent extreme intensity flicker and stroboscopic effect.

From Figs. 11 and 12 and the foregoing description, it will be evident that my optical economizer greatly increases the useful light transmitted by the projector objective system, enabling the objective system to transmit to the screen, full illumination from three full film frames, or their equivalent in film frame area, for all positions of the rectifying elements. From the general laws of conservation of energy and a realization that the optical economizer, coacting with the rectifying system, transmits to the screen, at all times, a substantially constant percentage of the visible radiant energy passing through the film frames overlying the projector aperture, it is evident that the screen image will be free from intensity flicker, hence, the economizer, without diaphragms in the objective system, completely overcomes this evil, which was formerly but partially remedied by the use of diaphragms. Thus the optical economizer further increases the light transmitting efficiency of the multiple lens optical rectifying system.

It is of interest to note that, while my optical economizer, in combination with an optical rectifying system, increases the efficiency and capacity of the objective system, it thereby necessitates further refinements in the optical system of the projector. This is evident for two reasons: first, the objective system must function without diaphragms: and second, it must operate successfully with a picture area equal to three film frames. Further refinement of the two lens wheel projector to meet these more exacting requirements, necessitates a considerable increase in lens wheel diameter and the use of many more lenses per wheel, a change which would make the projector more expensive and quite cumbersome and bulky. A search for a better way of obtaining the necessary further refinement in the objective system, led to the discovery and development of the single lens wheel system described in my co-pending patent application, Serial No. 441,657, filed April 4, 1930, and it is with this improved type of projector that my optical economizer functions most advantageously.

It will be evident from the foregoing, that the invention involved in the optical economizer construction, per se, is of very minor importance compared to the discovery of a means to be used in combination with projectors of the optical rectifying type, which so greatly enhances the capacity and utility of such projectors. The economizer, per se, is simply a means to an end, the end being the combination of a projector with an economizer to obtain the improvements and enlarged usefulness specified.

Having thus fully described my invention and its applications, what I claim is—

1. In combination, a film gate having an elongated aperture for exposing simultaneously three film frames of a continuously moving film strip overlying said elongated aperture, a lens system including compensating means for projecting simultaneously a stationary well defined image of each picture frame exposed in said gate, and a light deviator for the projected images, said deviator having an aperture for passing the central image frame, and a means on each side of the aperture for registering the images projected from the remainder of the film gate with the images passed through the aperture.

2. In combination, a film gate having an elongated aperture for exposing simultaneously three picture frames on a film strip moving continuously across the gate, a plurality of identical rectifying elements moving with the film for projecting images of the picture frames in the film gate and for compensating for the moving film frames to produce stationary images, and a light deviator for the projected images, said deviator having an aperture for passing the central image frame, and means on each side of the aperture for registering the images projected from the remainder of the film gate with the image passed through the aperture.

3. In combination, a film gate having an elongater aperture for exposing simultaneously three picture frames on a film strip moving continuously across the gate, a plurality of identical rectifying elements moving with the film for projecting images of the picture frames in the film gate and for compensating for the moving film frames to produce stationary images, and a light deviator for the projected images, said deviator having an aperture for passing the central image frame, and achromatized prisms adjacent opposed edges of the aperture for registering images projected from the remainder of the film gate with the image passed through the aperture.

4. In combination, a film gate having an elongated aperture for exposing simultaneously three picture frames on a film strip moving continuously across the gate, a plurality of identical rectifying elements moving with the film for projecting stationary images of said picture frames, and a light deviator for the projected images, said deviator having an aperture for passing the central image frame, and pairs of adjustably mounted mirrors adjacent opposed edges of the aperture for registering the images projected from the remainder of the film gate with the image passed through the aperture.

5. In combination, a film gate having an elongated aperture for exposing simultaneously three picture frames on a film strip moving continuously across the gate, a plurality of identical rectifying elements moving with the film for projecting stationary images of said picture frames, and a light deviator for the projected images, said deviator having an aperture for passing the central image frame, and means adjacent opposed edges of the aperture for registering the images projected from the remainder of the film gate with the image passed through the aperture.

ARTHUR J. HOLMAN.